United States Patent [19]

Goodwin

[11] Patent Number: 4,911,106

[45] Date of Patent: Mar. 27, 1990

[54] PET RESTRAINING TABLE APPARATUS

[76] Inventor: Kenneth D. Goodwin, 4817 Cheek Sparger, Grapevine, Tex. 86051

[21] Appl. No.: 171,899

[22] Filed: Mar. 22, 1988

[51] Int. Cl.$^4$ ............................................. A01K 13/00
[52] U.S. Cl. ..................................... 119/103; 119/96; 128/870
[58] Field of Search .................... 119/96, 101, 103; 248/133, 137, 138, 284; 269/323; 128/869, 870; 5/61, 62, 63, 64, 81 R

[56] References Cited

U.S. PATENT DOCUMENTS

| | | | |
|---|---|---|---|
| 520,576 | 5/1894 | Scearce | 269/323 |
| 1,166,018 | 12/1915 | Soresi | 269/323 |
| 1,644,043 | 10/1927 | Tiedemann | 5/61 X |
| 1,717,531 | 6/1929 | Trees | 119/103 |
| 1,780,399 | 11/1930 | Munson | 5/61 |
| 1,799,692 | 4/1931 | Knott | . |
| 2,188,592 | 1/1940 | Cunningham | 5/61 |
| 2,667,169 | 1/1954 | Kambourakis | 128/372 |
| 2,965,071 | 12/1960 | Scott et al. | 119/103 |
| 3,092,079 | 6/1963 | Strebel et al. | 119/103 |
| 3,815,164 | 6/1974 | Smith | 5/63 X |
| 4,184,451 | 1/1980 | Carlin | 119/103 |
| 4,356,577 | 11/1982 | Taylor et al. | 269/323 X |
| 4,459,941 | 7/1984 | Moffatt | 119/103 |
| 4,578,833 | 4/1986 | Vrzalik | 128/869 X |

FOREIGN PATENT DOCUMENTS

| | | | |
|---|---|---|---|
| 158840 | 9/1954 | Australia | 119/103 |
| 8000501 | 8/1981 | Netherlands | 119/103 |

*Primary Examiner*—John Weiss
*Attorney, Agent, or Firm*—Hubbard, Thurman, Turner, Tucker & Harris

[57] ABSTRACT

A pet restraining table is used to support and restrain a small animal, such as a cat, for grooming purposes. The table has a base with separable upper and lower portions, an elevated outer frame secured to the base for pivotal motion relative thereto about a horizontal first axis and releasably lockable to the base, and a table top portion secured to the periphery of the outer frame for pivotal motion relative thereto about a second horizontal axis parallel to the first axis. With the outer frame in a horizontal position, and the table top member positioned horizontally therein and releasably secured thereto by a latching mechanism, the cat is positioned face down on the upper side surface of the table top member for back side grooming purposes, and is tied to the outer frame using various elastic tie-down straps. When it is desired to groom the underside of the cat, the table top member is unlatched from the outer frame, pivoted 360° to position it over the cat while the tie-down straps suspend the cat from the outer frame, and is then re-latched to the outer frame. The outer frame is then unlocked from the base, pivoted 180° and relocked to the base, to thereby cause the strap-restrained cat to be supported face-up on the re-oriented table top member.

10 Claims, 3 Drawing Sheets

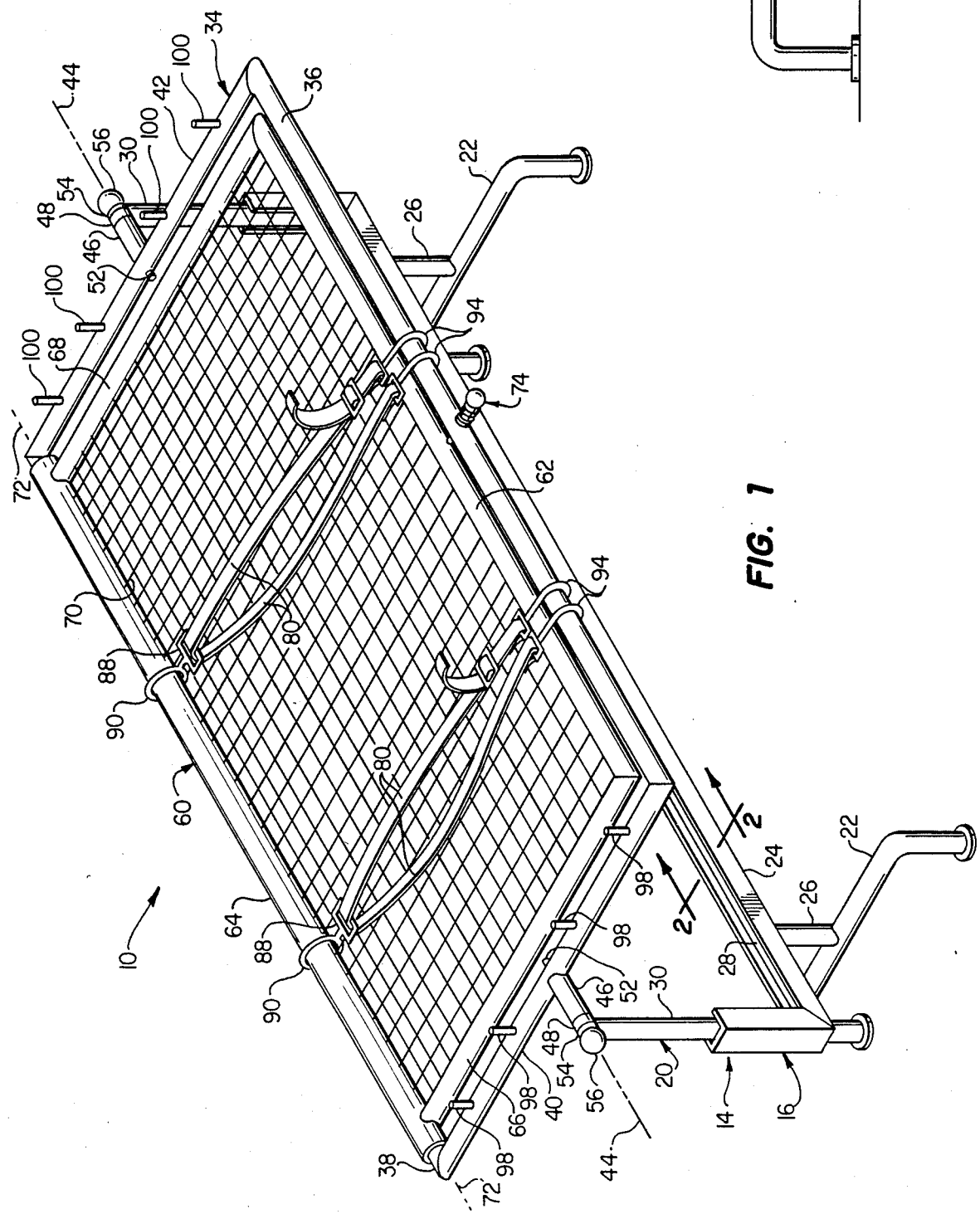

4,911,106

PET RESTRAINING TABLE APPARATUS

BACKGROUND OF THE INVENTION

The present invention relates generally to animal handling apparatus and, in a preferred embodiment thereof, more particularly provides a uniquely constructed and operative animal restraining table used in the grooming and bathing of small pet animals such as cats.

It is well known in the animal grooming industry that small pets, particularly cats, tend in many instances to violently resist efforts to groom and bathe them. This feline aversion to being groomed and bathed has led to the common practice of using two or more assitants to hold the cat down, on a table or the like, while the groomer attends to bathing the cat and/or clipping its fur. To protect themselves from the teeth and claws of the cat, the assistants must wear heavy leather gloves and must periodically reposition the struggling cat on the table to provide the groomer with access to all portions of the cat's body.

Alternatively, the assistants may simply strap the cat down on the table. However, it is still necessary to reposition the cat on the table after one portion of its body has been groomed or bathed. This requires that the cat be untied, shifted on the table, and then tied down again in its shifted position.

This conventional necessity of firmly holding and periodically shifting the cat is a laborious task which often frays the nerves of both the cat and its handlers, and can lead to injuries to the cat and/or its handlers. It is accordingly an object of the present invention to provide improved animal restraining apparatus which eliminates or minimizes above-mentioned and other problems associated with the grooming and bathing of cats or other small pets.

SUMMARY OF THE INVENTION

In carrying out principles of the present invention, in accordance with a preferred embodiment thereof, a pet restraining table is provided which has a base with separable upper and lower portions, an elevated outer frame secured to the upper base portion for pivotal motion relative thereto about a horizontal axis extending centrally through the frame, and locking means for releasably holding the outer frame in a selected rotational orientation relative to the upper base portion.

A side edge portion of the table top member is secured to a peripheral portion of the outer frame for pivotal motion relative thereto about a horizontal axis spaced from and parallel to the frame axis. Latch means are provided for releasably latching the table top member to the outer frame in a position in which the table top member extends across the outer frame. Suitable strap means are provided which are intersecurable between an animal to be groomed or bathed and the outer frame, and function to support and immobilize the animal.

When it is desired to groom or bathe a small pet animal, such as a cat, the outer frame, with the table top member latched thereto, is locked in a horizontal position and the cat is positioned, for example, face down on the table top member and tied to the outer frame using the restraining strap means. The upwardly facing back side of the restrained and supported cat may be then groomed and/or bathed by a single groomer.

To groom or bathe the underside of the cat, the table top member, which is positioned below and supports the cat, is unlatched from the outer frame and pivoted through an arc of 360° and re-latched to the outer frame. During this pivotal motion of the table top member, the cat is firmly yet safely suspended from the outer frame by the restraining strap means, and after the table top member is re-latched to the outer frame, it is positioned above the back of the still-restrained cat. Next, the outer frame is unlocked and pivoted through a 180° arc to thereby position the restrained cat in a face up position on the reoriented table top member to thereby provide complete grooming and bathing access to the underside of the shifted cat without the necessity of untying and retying the cat, or otherwise touching or handling it.

To conveniently transport the restrained cat from one location to another, the outer frame, with the table top member latched thereto, is simply pivoted to a vertical position and locked to the upper base portion. The entire upper portion of the table, with the cat secured thereto, is then lifted from the separable lower base portion and carried away in an easy to handle vertical orientation.

The pet restraining table of the present invention is of a very simple and inexpensive construction, yet significantly reduces the handling requirements for bathing and grooming the cat or another small pet such as a dog. In this manner, the stress and strain on both the animal and its groomer are significantly reduced, the possibility of injury to either is greatly diminished, and the grooming and bathing process is considerably simplified.

BRIEF DESCRIPTION OF THE DRAWINGS

FIG. 1 is a perspective view of a pet restraining table which embodies principles of the present invention;

FIG. 2 is an enlarged scale fragmentary cross-sectional view through a removable base portion of the table taken along line 2—2 of FIG. 1;

DETAILED DESCRIPTION

Figure 3:
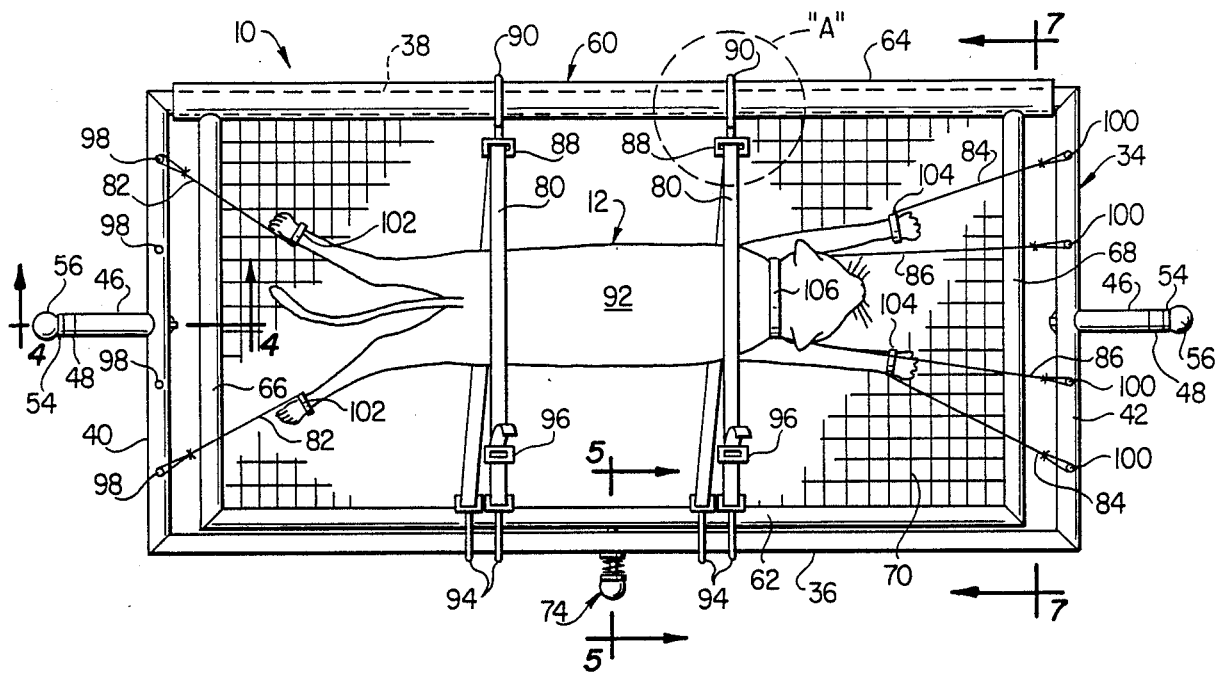
FIG. 3 is an enlarged scale top plan view of the table, with a cat operatively supported and restrained thereon in a prone position by means of various elastic tie-down straps.

Perspectively illustrated in FIG. 1 is a pet restraining table 10 which embodies principles of the present invention and, in a unique manner subsequently described, is utilized to support and restrain a small animal such as the cat 12 depicted in FIG. 3, for grooming or bathing purposes or the like. Table 10 includes a base structure 14 comprising a lower portion 16 supportable on a floor 18 (FIG. 2), and an upper portion 20 which is separable from the lower base portion 16.

Lower base portion 16 is provided with a pair of inverted U-shaped floor support legs 22 which are secured to opposite ends of the underside of a U-shaped channel frame 24 by vertically extending support posts 26. The upper base portion 20 is defined by a U-shaped pipe frame having a horizontal lower side portion 28 and a pair of vertical portions 30 extending upwardly from its opposite ends. As best illustrated in FIG. 2, a lower side portion of this pipe frame is removably receivable and supportable within the channel frame 24 and may be lifted upwardly therefrom as indicated by the arrow 32.

Figure 4:
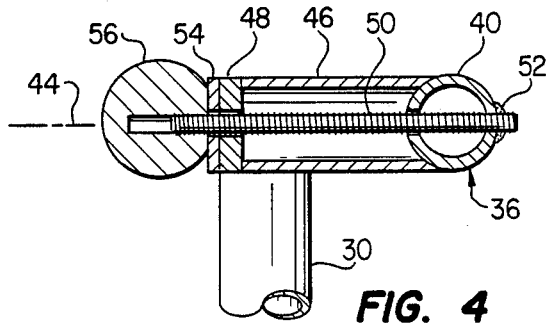
FIG. 4 is an enlarged scale cross-sectional view taken through a pivotal locking portion of the table along line 4—4 of FIG. 3.

Referring now to FIGS. 1, 3 and 4, the table 10 also includes an elongated rectangular outer frame 34 which is formed from welded together hollow pipe sections and has a pair of elongated front and rear side portions 36 and 38, and a pair of shorter left and right end portions 40 and 42. The frame 34 is pivotally mounted on the upper ends of the pipe frame end members 30, for rotation about a horizontal axis 44 extending centrally through the opposite ends of the frame 34 as depicted in FIG. 1, by means of a pair of pipe stub members 46 welded at their inner ends to central portions of the frame end members 40, 42 and projecting transversely outwardly therefrom. The outer ends of the pipe stubs 46 rotatably abut the inner side surfaces of a pair of generally circular support flanges 48 welded to the upper ends of the pipe elements 30 as depicted in FIG. 4. An elongated, threaded rod 50 is extended inwardly through each of the support flanges 48, through the interior of its associated pipe stub 46, transversely through the frame end portions 40, 42 and is welded at its inner end to the frame end portion as indicated by the reference numeral 52 in FIG. 4.

The outer ends of the rods 50 are extended outwardly through washers 54 positioned against the outer side surfaces of the support flanges 48, and are threaded into tightening balls 56. With the balls 56 sufficiently loosened, the outer frame 34 may be rotated through a 360° arc about the axis 44 relative to the base structure 14. However, by sufficiently tightening the balls 56 on the outer ends of the rods 50, the outer ends of the pipe stubs 46 are drawn tightly against the inner side surfaces of the support flanges 48 to thereby frictionally lock the outer frame 34 in a selected pivotal orientation relative to the base structure 14. For example, the frame 34 may be locked in the essentially horizontal position depicted in FIG. 1.

For purposes of supporting the cat 12, the table 10 is also provided with a table top member defined by an elongated rectangular inner frame 60 formed from welded together hollow pipe sections and having elongated front and rear side portions 62 and 64, and shorter left and right end portions 66 and 68. Secured within the inner frame 60 is an expanded metal support grid section 70. The rear side portion 64 of the table top member frame 60 is of a larger diameter than the rear side portion 38 of the outer frame 34 and coaxially circumscribes the outer frame rear side portion 38. This captively retains the inner frame 60 on the outer frame 34 to be pivoted relative to the outer frame 34, about a horizontal axis 72 extending axially through the rear side portion 38 of the outer frame, between first and second oppositely facing positions in which the table top member extends across the interior of the outer frame 34 as depicted in FIG. 1. More specifically, the table top member defined by the inner frame 60 and the support grid 70 may be pivoted from its position indicated in FIG. 1 in either direction about the axis 72 through an arc of 360° to bring it back within the interior of the outer frame 32 so that what was initially the upper side of the table top member is converted to its lower side.

Figure 5:
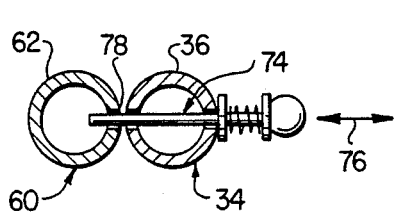
FIG. 5 is an enlarged scale cross-sectional view through a latch portion of the table taken along line 5—5 of FIG. 3.

The table top member may be releasably latched in either of these oppositely facing positions by means of a small, spring-loaded latch member 74 (FIG. 5) which is secured to a central portion of the front side 36 of the outer frame 34 and is movable in opposite directions, as indicated by the double-ended arrow 76 in FIG. 5, between a latching position in which the member 74 enters a side opening 78 in the inner frame front side portion 62 and prevents the inner frame from rotating relative to the outer frame, and an unlatching position in which the member 74 is withdrawn from the inner frame and permits it to be rotated relative to the outer frame as previously described.

Figure 6:
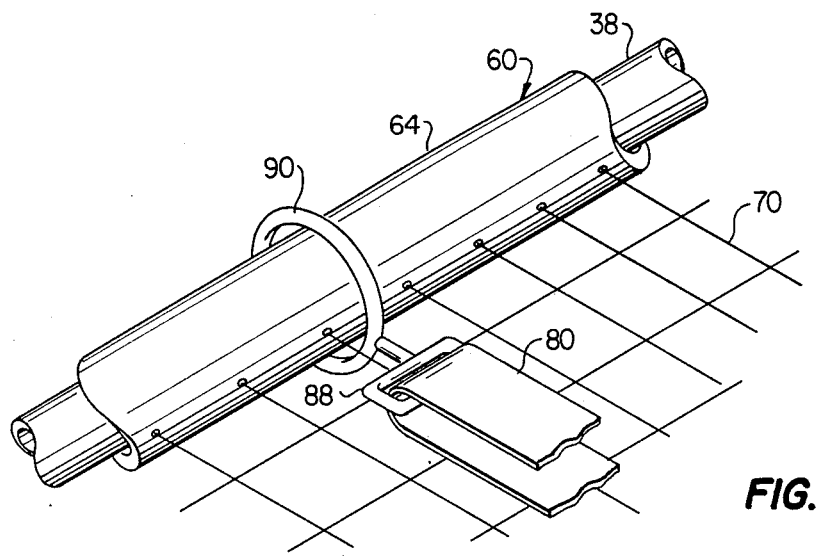
FIG. 6 is an enlarged scale perspective detail view of a restraining strap connection portion of the table within the dashed circle "A" in FIG. 3.

To use the table 10 for purposes of grooming and/or bathing the cat 12, the outer frame 34, with the inner frame 60 latched therein, is locked in the horizontal position illustrated in FIG. 1. The cat 12 is gently placed face down on the horizontal grid structure 70 and restrained and immobilized on the table 10 by means of a supporting tie-down system which includes a pair of main tie-down straps 80, and auxiliary elastic tie-down strap pairs 82, 84 and 86. As best illustrated in FIGS. 3 and 6, the main tie-down straps 80 are looped through rectangular metal eyes 88 secured to metal support rings 90 slidably mounted on the rear side portions 64 of the inner frame 60. From their junctures with the eyes 88, the opposite halves of each of the straps 80 are passed above and beneath the trunk portion 92 of the cat and are removably secured at their outer ends to the front side portion 36 of the outer frame 34 by suitable hook members 94. The straps 80 may be tightened around the cat's trunk 92 by means of adjustable buckle members 96.

Two spaced series of metal tie-down studs 98 and 100 are respectively welded to the end portions 40 and 42 of the outer frame 34 and project upwardly therefrom. The elastic straps 82 are provided at their inner ends with adjustable loop portions 102 which are secured to the cat's rear paws as shown in FIG. 3, while the outer ends of the straps 82 are suitable knotted around two of the tie-down studs 98. In a similar manner, the elastic straps 84 are secured at their inner ends to a pair of adjustable loop portions 104 fastened around the cat's front paws, with the outer ends of the straps 84 being suitably knotted to a pair of the tie-down studs 100. A restraining collar 106 is fitted around the cat's neck and secured to the inner ends of the elastic straps 86 which are knotted at their outer ends to a pair of the tie-down studs 100, also as depicted in FIG. 3.

Figure 7:
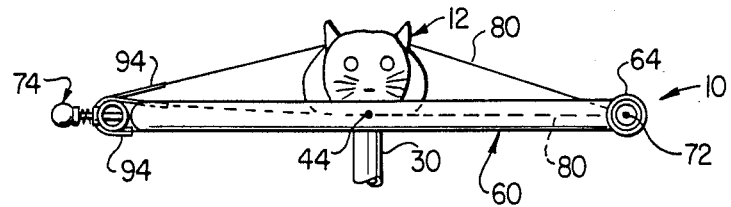
FIGS. 7–7D are simplified, somewhat schematic cross-sectional views through the table, taken along line 7—7 of FIG. 3, and sequentially illustrate the unique manner in which, by simply pivoting various components of the table, the cat can be shifted from a prone position on the table (FIG. 7) to a supine position thereon (FIG. 7D) without untying the cat.

With the cat 12 securely but humanely immobilized in this manner as depicted in FIGS. 3 and 7, its entire upwardly facing back side may be groomed, bathed and like. When it is desired to groom or bathe the underside of the cat 12, the table 10 uniquely permits the cat to be shifted to a face up position on the table (FIG. 7D) without untying the cat therefrom.

Figure 7A:
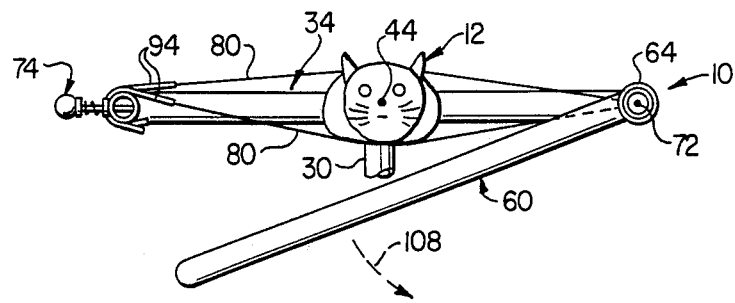
Figure 7B:
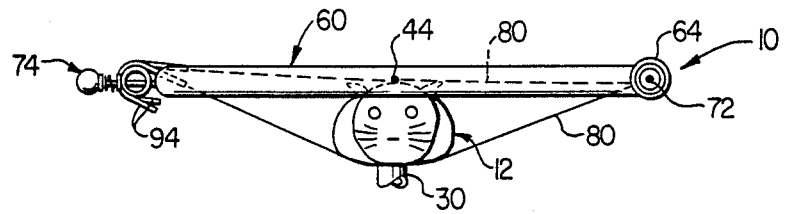

To accomplish this unique vertical reversal of the cat on the table, thus shifting the cat from a prone to a supine position, the latch member 74 is pulled outwardly to release the inner frame 60 from the outer frame 34. The inner frame, as schematically depicted in FIG. 7A, is then pivoted about its axis 72 in a counterclockwise direction as indicated by the arrow 108 in FIG. 7A through a 360° arc until it is positioned over the cat 12 (FIG. 7B) and is once again positioned within the outer frame 34. Once the inner frame 60 has been pivoted to this re-oriented position it is re-latched within the outer frame 34 using the latch member 74. During this pivotal motion of the inner frame 60, the cat 12 is suspended from the outer frame 34 by means of the previously described restraining strap tie-down system.

Figure 7C:
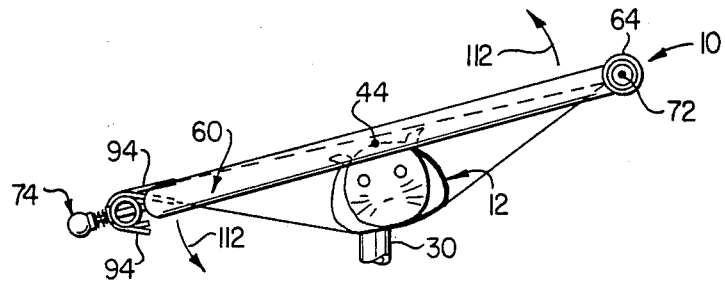

Next, as illustrated in FIG. 7C, the outer frame 34 is unlocked from its supporting base, using the tightening balls 56, and is pivoted in a counterclockwise direction as indicated by the arrows 112 through a 180° arc about its axis 44, and then is relocked to the frame.

Figure 7D:
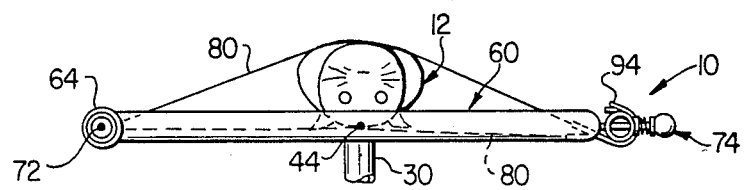

This sequence of pivoting the inner and outer frames, results in positioning the cat 12 in a face-up position on the table 10 as depicted in FIG. 7D so that its entire underside may now be groomed and/or bathed. After the cat's underside has been groomed and/or bathed, the repositioned cat may be untied from the table. Alternatively, the still restrained cat may be conveniently transported to another location for further grooming or the like simply by unlocking the outer frame 34, pivoting it to a vertical position, and then relocking the outer frame to the base. The upper side of the now vertically oriented outer frame may then be simply grasped and lifted to thereby lift the upper base portion 20 (FIG. 2) out of its supporting channel frame 24. The inner and outer frames, and the upper base portion may then be carried away in an easy to handle vertical orientation with the cat 12 will strapped to and restrained on the table structure.

It can be seen from the foregoing that the pet restraining table 10 significantly reduces the overall handling requirements for bathing and grooming a cat or other small pet. In this manner, the stress and strain on both the animal and its groomer are significantly reduced, the possibility of injury to either is greatly diminished, and the grooming and bathing process is considerably simplified. The table 10 is of a very simple and inexpensive construction and may be fabricated from readily available standard components. Additionally, the table is very easy to handle and carry from place to place.

The foregoing detailed description is to be clearly understood as being given by way of illustration and example only, the spirit and scope of the present invention being limited solely by the appended claims.

What is claimed is:

1. Animal restraining table apparatus comprising:
   a floor supportable base;
   an outer frame having a peripheral portion extending generally in a plane;
   mounting means for securing said outer frame to an upper portion of said base for pivotal movement relative thereto about a first generally horizontal axis through a 180° arc between first and second positions in which said plane is generally horizontally disposed;
   locking means for releasably locking said outer frame in a selected pivotal orientation relative to said upper portion of said base;
   a table top member adapted to support an animal and having first and second opposite sides;
   attachment means for securing a peripheral portion of said table top member to said peripheral portion of said outer frame for pivotal movement relative thereto about a second generally horizontal axis through a 360° arc between first and second positions in which said table top member extends across said outer frame and is generally disposed within said plane, said first side of said table top member facing upwardly when said outer frame and said table top member are in said first positions thereof;
   latching means for releasably latching said table top member to said outer frame in a selected one of said first and second positions of said table top member; and
   restraining means, securable to said outer frame, for restraining an animal supported atop said table top member in said first position thereof and latched to said outer frame locked in said first position thereof, and for suspending the animal from said outer frame when said table top member is pivoted from its first position to its second position,
   whereby an animal may be restrained on said table apparatus in a first orientation, and then shifted to a second, oppositely facing orientation, while still restrained, by:
   supporting a first surface portion of the animal, such as its underside, atop said first side of said table top member in said first position thereof and latched to said outer frame locked in said first position thereof,
   operatively connecting said restraining means to the animal,
   unlatching said table top member from said outer frame, pivoting said table top member from its first position to its second position in which said table top member extends generally across an opposite surface portion of the animal, such as its back side, and relatching said table top member to said outer frame, and
   unlocking said outer frame, pivoting it to its second position, and then relocking it.

2. The apparatus of claim 1 wherein:
   said first axis extends through a central portion of said outer frame, and
   said second axis is parallel to and laterally spaced from said first axis.

3. The apparatus of claim 1 wherein:
   said restraining means include first strap means, intersecurable between opposite side portions of said outer frame, for restraining and supporting a trunk portion of the animal; second strap means, intersecurable between the limbs of the animal and said outer frame, for restraining and supporting the limbs of the animal; and third strap means, insecurable between the neck of the animal and said outer frame, for restraining and supporting the neck of the animal.

4. The apparatus of claim 1 wherein:
   said base has a lower floor supportable portion adapted to removably receive and support said upper portion of said base, whereby an animal operatively restrained on said table apparatus by said restraining means may be conveniently transported to a second location by locking said outer frame in a vertical orientation with the table top member latched thereto, removing said upper base portion from said lower base portion, and then carrying the outer frame, table top member and upper base portion away in a vertical orientation.

5. The apparatus of claim 1 wherein:
   said locking means includes means for frictionally preventing relative movement between said outer frame and said upper portion of said base.

6. The apparatus of claim 1 wherein:
said latching means include a spring-loaded latch member carried by said outer frame and movable between a latching position in which said latch member engages said table top member and prevents pivotal movement thereof relative to said outer frame, and an unlatching position in which said table top member is freed to pivot relative to said outer frame.

7. A pet restraining table comprising:
a frame;
base means for supporting said frame in an elevated position for rotation about a first generally horizontal axis;
locking means for releasably locking said frame in a selectively variable rotational orientation;
table top means for supporting a pet for grooming, bathing or the like;
attachment means for securing said table top means to said frame for rotation of said table top means through a 360° arc relative to said frame about a second generally horizontal axis between oppositely facing first and second positions in which said table top means extend parallel to and across said frame;
latching means for releasably latching said table top means to said frame in a selected one of said first and second positions of said table top means; and
restraining means, interconnectable between said frame and selected portions of an animal, for immobilizing the animal and supporting it from said frame,
said first and second axes being essentially parallel and laterally spaced from one another.

8. The pet restraining table of claim 7 wherein:
said first axis extends through a central portion of said frame, and
said second axis extends through adjacent peripheral side edge portions of said frame and said table top means.

9. The pet restraining table of claim 7 wherein:
said base means include a floor supportable lower portion, and an upper portion adapted to be removably received and supported within said lower portion, said frame being rotatably mounted on said upper portion of said base means.

10. Table apparatus for supporting an object and adjustably positioning it to provide access to top and bottom side portions thereof, said table apparatus comprising:
a support base structure;
an outer frame member having a peripheral portion lying generally in a plane and carried by said support base structure for pivotal movement relative thereto about a first horizontal axis through a 180° arc between first and second positions in which said plane is generally horizontally disposed;
locking means for releasably locking said outer frame member in a selected one of said first and second positions thereof;
restraining means, connectable to said outer frame member to extend across an interior portion thereof, for engaging top and bottom side portions of the object, and restraining and supporting the object;
a table top member carried by said outer frame member for pivotal movement therewith relative to said support base structure, and for pivotal movement relative to said outer frame member about a second horizontal axis parallel to said first axis through a 360° arc from a first position, through an intermediate position to a second position,
said table top member in said first position thereof extending across the interior of said outer frame member peripheral portion along one side of said restraining means,
said table top member in said intermediate position thereof extending outwardly from a peripheral side edge portion of said outer frame member,
said table top member in said second position thereof extending across the interior of said outer frame member along an opposite side of said restraining means; and
latch means for releasably holding said table top member in a selected one of its first and second positions.

* * * * *

UNITED STATES PATENT AND TRADEMARK OFFICE
CERTIFICATE OF CORRECTION

PATENT NO. : 4,911,106

DATED : March 27, 1990

INVENTOR(S) : Kenneth D. Goodwin

It is certified that error appears in the above-identified patent and that said Letters Patent is hereby corrected as shown below:

Column 5, line 31, "will" should be --still--.

Column 6, line 49, "insecurable" should be --intersecurable--.

Column 6, line 66, "includes" should be --include--.

Signed and Sealed this

Thirtieth Day of July, 1991

Attest:

HARRY F. MANBECK, JR.

Attesting Officer

Commissioner of Patents and Trademarks